United States Patent [19]

Dana et al.

[11] 4,323,408
[45] Apr. 6, 1982

[54] FILAMENT WINDING OF PLASTIC ARTICLES

[75] Inventors: William R. Dana, Corona del Mar; Ralph S. Friedrich, Hermosa Beach; John D. McKenney, South Laguna, all of Calif.

[73] Assignee: Ameron, Inc., Monterey Park, Calif.

[21] Appl. No.: 78,887

[22] Filed: Sep. 25, 1979

[51] Int. Cl.³ .......................................... B65H 81/00
[52] U.S. Cl. ................................. 156/175; 156/425
[58] Field of Search .............. 156/425, 172, 173, 175, 156/168, 457, 456; 242/7.21, 7.22, 7.23, 7.01, 7.02, 7.03; 285/157

[56] References Cited

U.S. PATENT DOCUMENTS

| | | | |
|---|---|---|---|
| 2,788,836 | 4/1957 | Trevaskis et al. | 242/2 |
| 2,901,190 | 8/1959 | Wentz | 156/170 |
| 3,112,234 | 11/1963 | Krupp | 156/169 |
| 3,201,298 | 8/1965 | Baker et al. | 156/431 |
| 3,308,001 | 3/1967 | Angrave | 156/425 |
| 3,363,849 | 1/1978 | McLarty | 156/173 |
| 3,397,847 | 8/1968 | Thaden | 156/425 |
| 3,552,665 | 1/1971 | Kelly | 156/172 |
| 3,765,979 | 10/1973 | Thomas | 156/173 |
| 3,963,185 | 6/1976 | Quirk | 156/172 |
| 4,089,727 | 5/1978 | McLain | 156/431 |

OTHER PUBLICATIONS

"Filament Winding Machines for High Pressure Pipe Elbows", Reinforced Plastics, May 1967, p. 268.

Primary Examiner—Michael W. Ball
Attorney, Agent, or Firm—Christie, Parker & Hale

[57] ABSTRACT

Resin-coated filaments wound around a mandrel to make a plastic pipe or fittings. In making a fitting with a nonlinear axis, the mandrel is supported with one end adjacent a winding station and rotated about an axis substantially tangent to the nonlinear axis at the winding station. The rotating mandrel oscillates back and forth past the winding station while maintaining the nonlinear axis substantially tangent to the axis of rotation. Resin-coated filaments pass between longitudinally spaced and curved guide fingers and are wrapped around the rotating mandrel in overlapping helical patterns as it moves back and forth past the winding station. The mandrel is removed from the fitting after the resin has cured.

24 Claims, 19 Drawing Figures

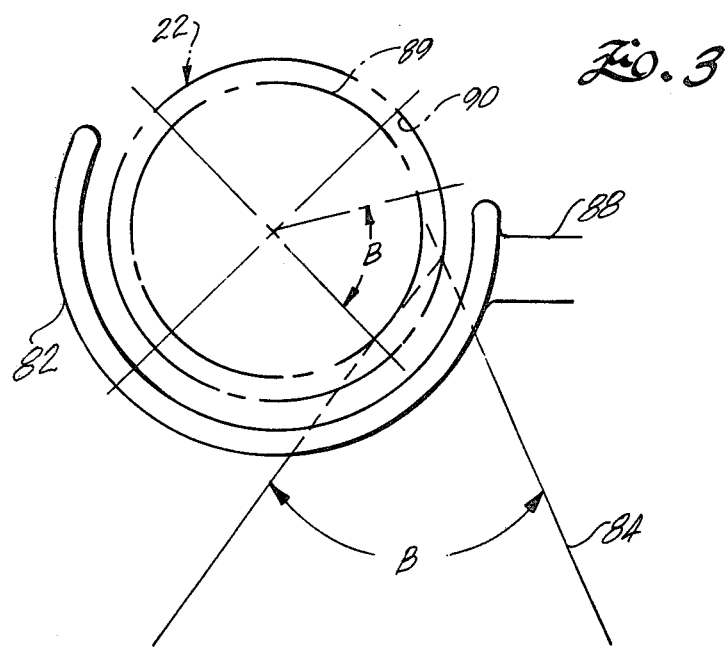
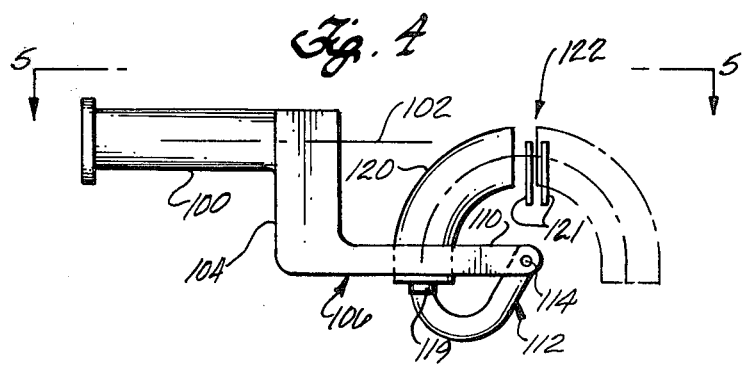
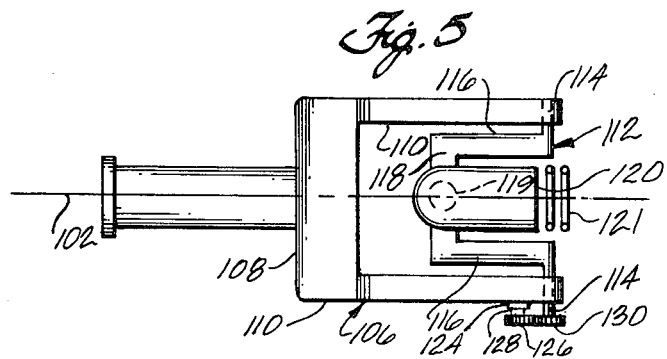

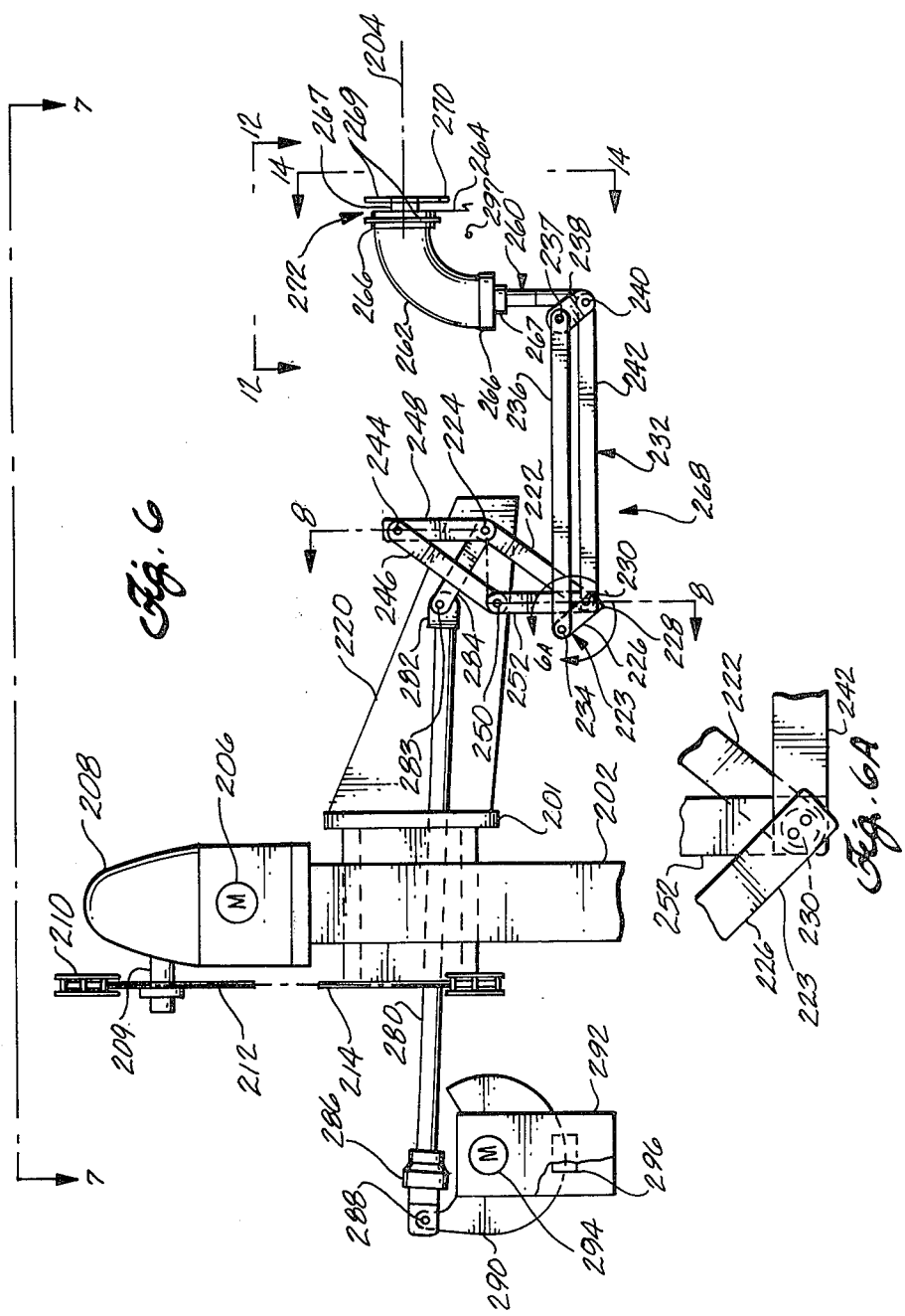

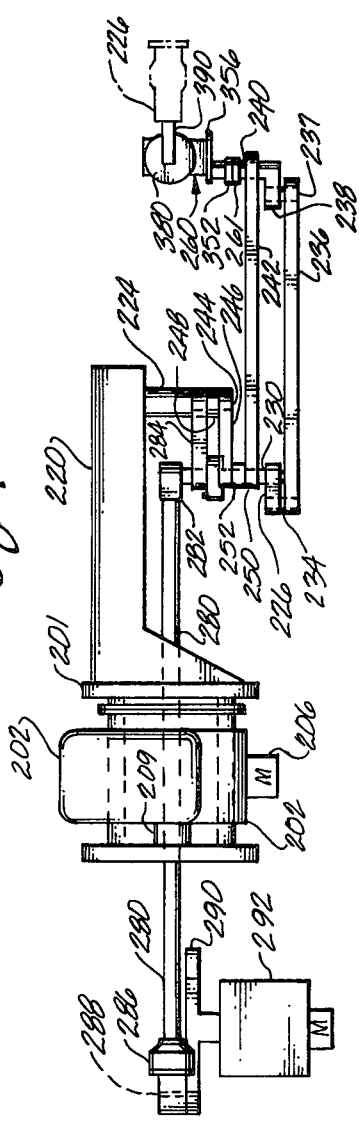

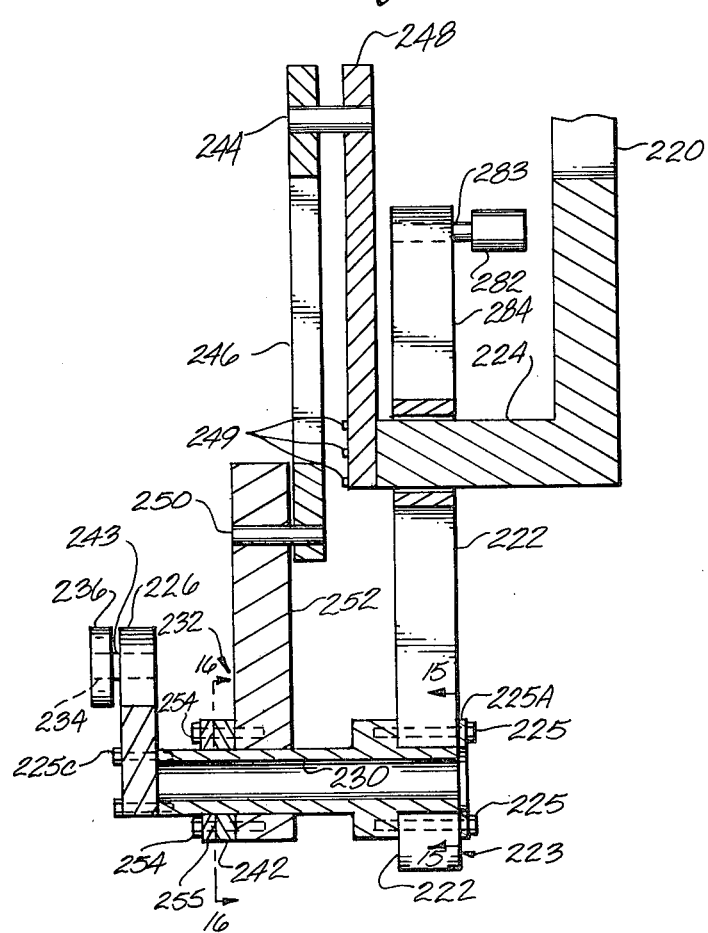
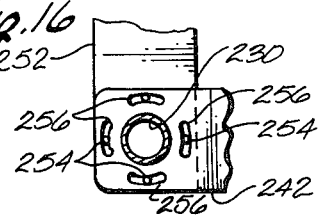
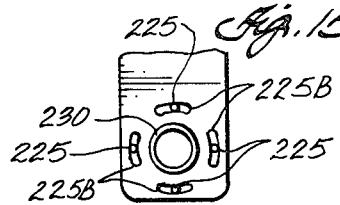

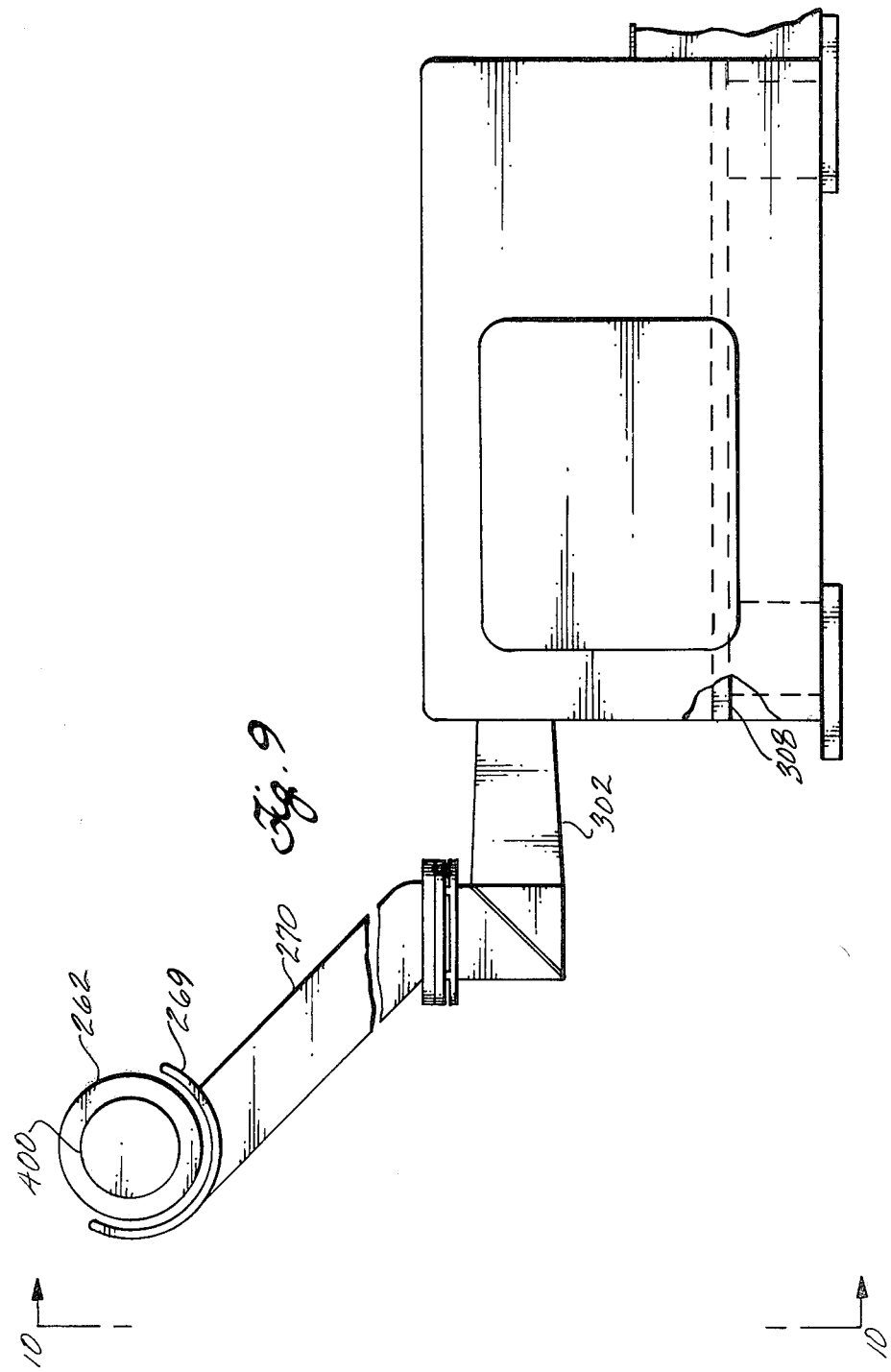

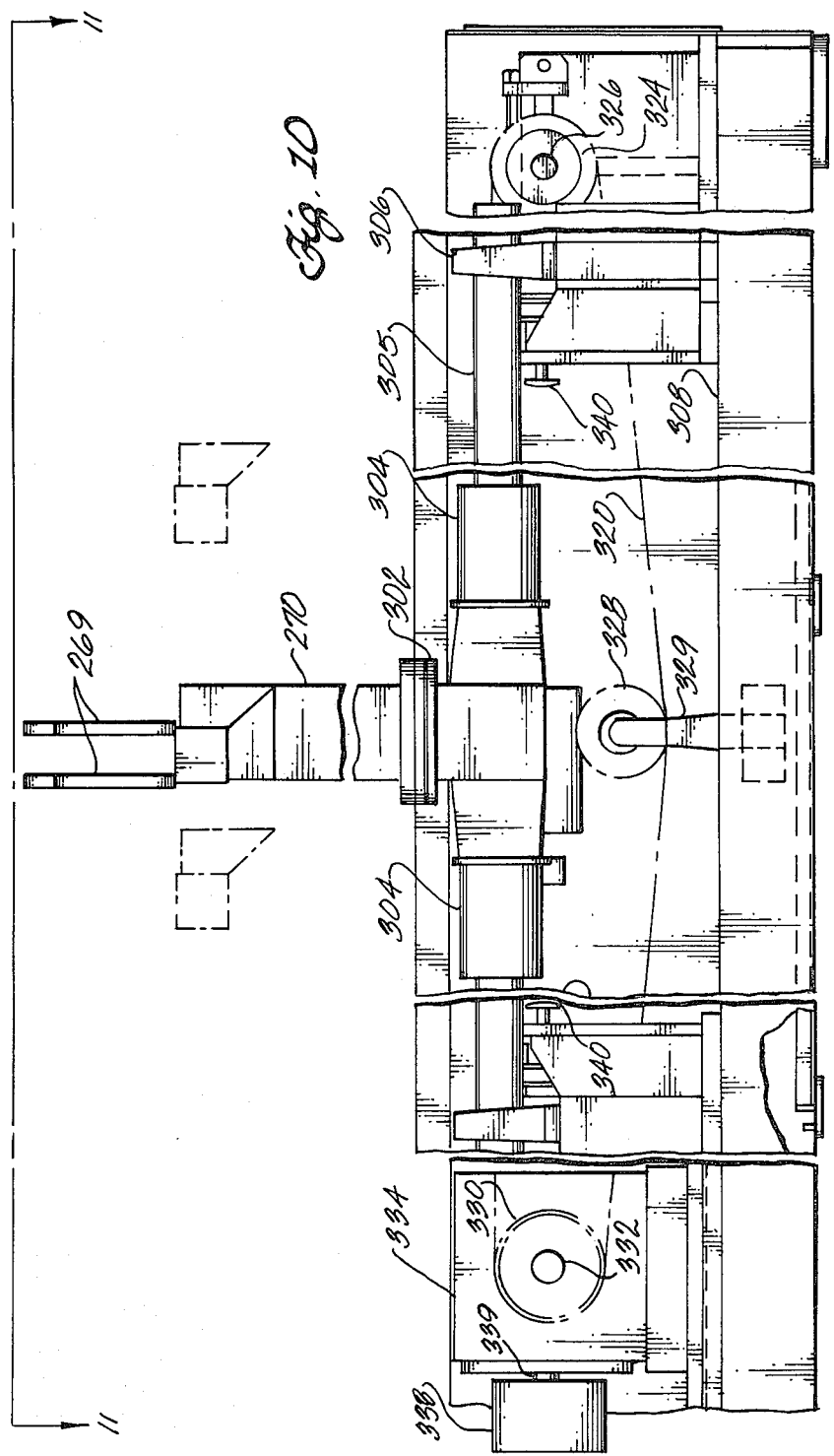

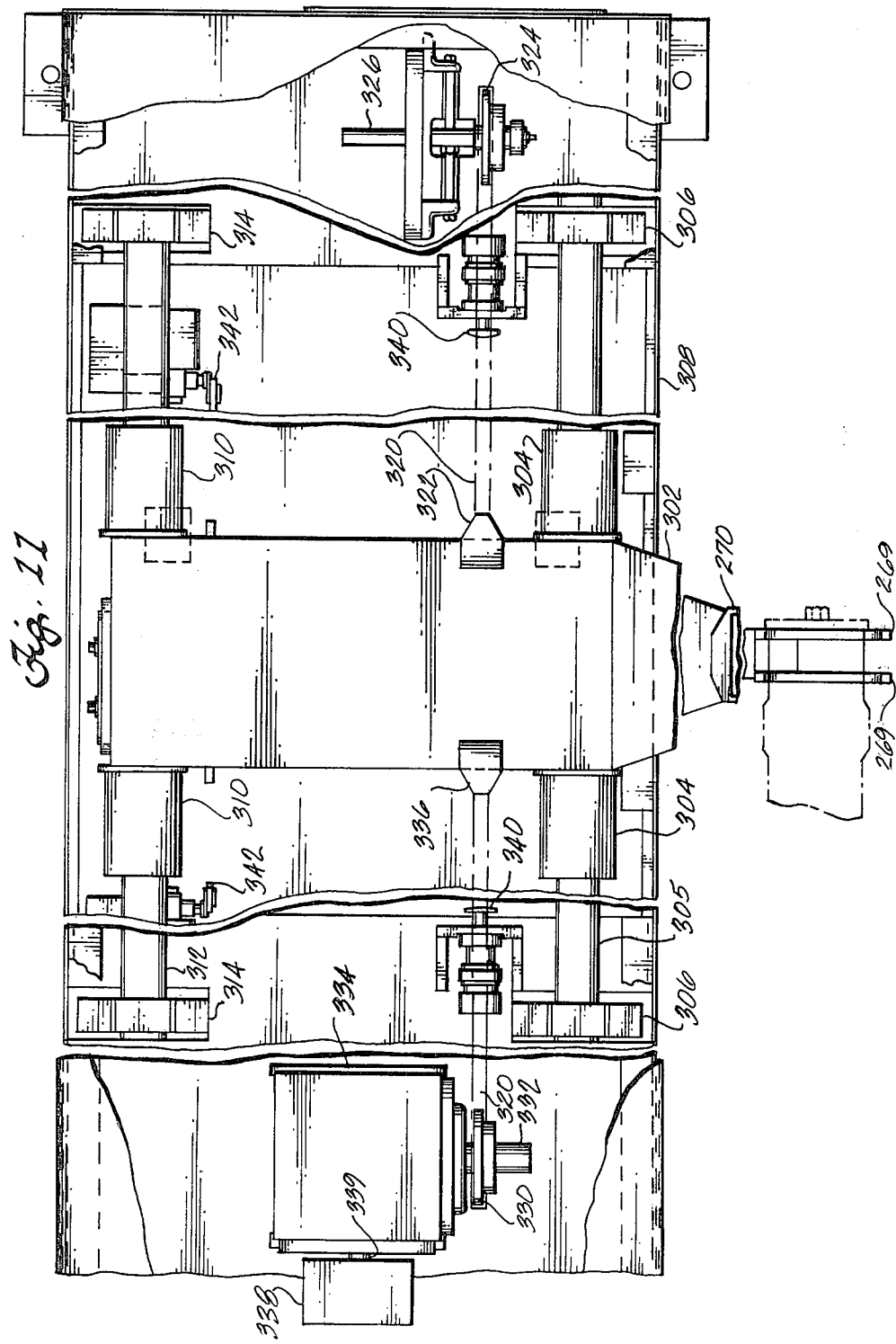

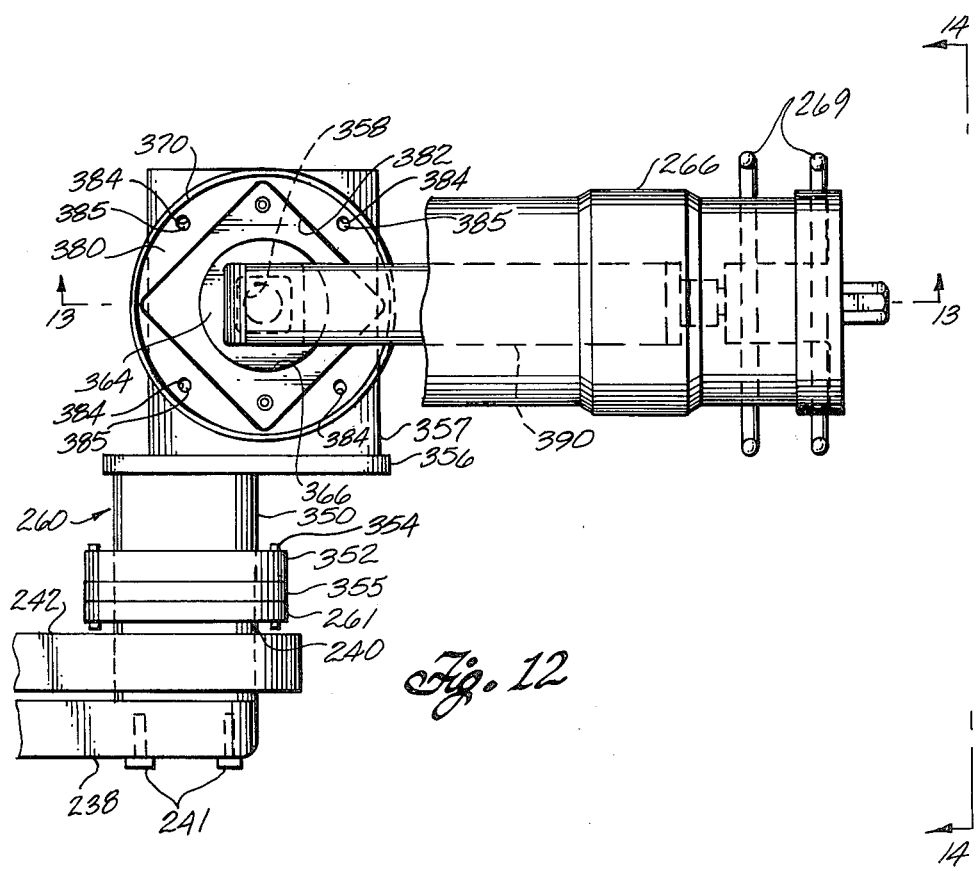

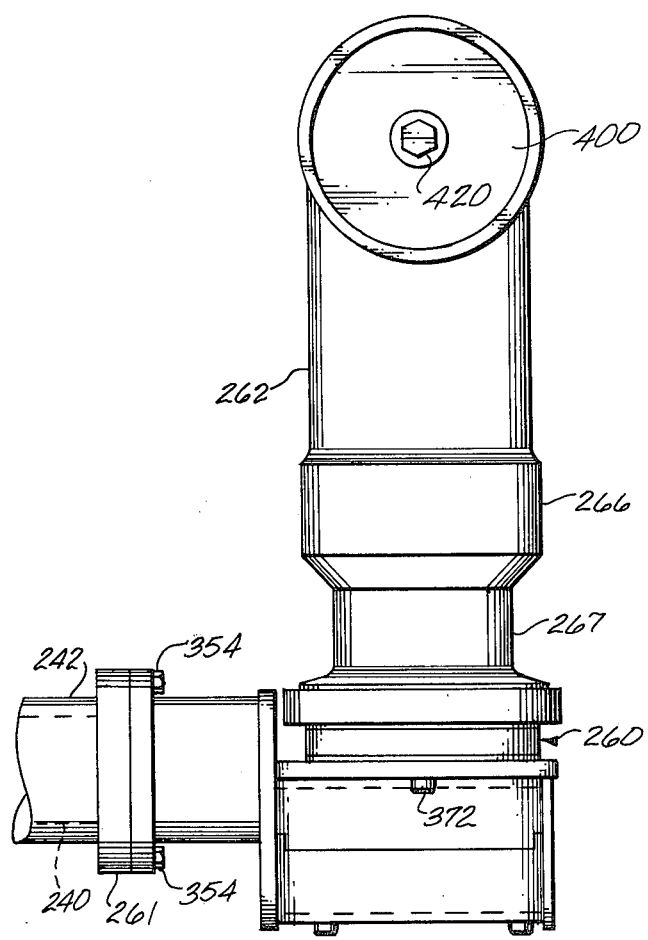

4,323,408

FILAMENT WINDING OF PLASTIC ARTICLES

FIELD OF THE INVENTION

This invention relates to apparatus and methods for making fiber-reinforced plastic articles, such as pipe and pipe fittings.

PRIOR ART

Reinforced thermosetting resin (RTR) pipe and fittings, such as elbows, have been made by a variety of processes which fall into two main categories, namely, molding processes and lay-up processes.

The molding processes usually employ the compression molding of a mixture of chopped glass fibers impregnated with a thermosetting resin. The resulting structure has relatively low strength and requires relatively thick walls to provide adequate strength. The flow of the glass fiber and resin mixture within the mold often produces "knit" areas over which the glass fibers are not intermeshed, with the result that strength in these "knit" areas is less than that in the other portions of the structure. Parts made by the molding process must be fully cured in the molds. This requires long mold cycle times, particularly for large parts. Moreover, molding pressures are high, requiring expensive, high-force molding presses and molds designed for high stress. The interior shapes of molded pipe elbows, for example, are constrained by practical limitations on core mold configurations. As a result, molded elbows have a number of disadvantages, including limited shape variations, high cost, and low strength.

In the lay-up methods for making RTR pipe elbows, thermosetting resin and glass fibers are applied to mandrels, which form the interior surface of the elbows. After application of the resin and fibers, the resin is cured by heat or equivalent energy. The various lay-up methods which have been used in the prior art include:

(1) hand lay-up of resin-impregnated, woven or mat reinforcements;
(2) chopper-gun application of short, randomly oriented fibers;
(3) hand-applied continuous strands of glass fiber reinforcements;
(4) combinations of hand-applied continuous fiber reinforcements and woven or mat reinforcements; and
(5) machine-applied continuous reinforcements.

Lay-up methods using hand-application of reinforcements produce products which are expensive because of high labor and material costs, and which are relatively low in quality because of variations from part to part in fiber orientation and amount.

Lay-up methods using machine-applied reinforcements are generally limited to the circumferential application of continuous fibers or woven tapes. U.S. Pat. No. 3,765,979 to Thomas shows a system for the machine application of continuous reinforcements to make a pipe fitting having a pair of intersecting tubular sections. The circumferential continuous fibers provide adequate circumferential strength, but inadequate axial strength, and must be supplemented with hand- or machine-applied longitudinal reinforcements. Machine-applied tapes can provide adequate circumferential and axial strengths, but are relatively expensive compared to parts made using continuous fiber reinforcements.

Filament-wound RTR pipe often employs helical windings of continuous glass fibers impregnated with resin, with the fibers oriented at an acute angle to the axis of the pipe to provide both adequate longitudinal and circumferential strength. U.S. Pat. No. 3,363,849 to McLarty shows apparatus for making such pipe.

Prior art machines for helically winding continuous glass fiber reinforcements in laid-up pipe fittings with nonlinear longitudinal axes have not been practical, even though it has long been known that such machines should provide fast production of high-strength parts at minimum material and labor costs. A prior art machine is described in an article entitled, "Filament-Winding Machine for High Pressure Pipe Elbows", in the May, 1967, issue of *Reinforced Plastics*. The production rate of fittings by that machine is limited because it uses a table which carries spools of reinforcing fibers, and rotates in a horizontal plane about an elbow-shaped mandrel to wrap the fibers around the mandrel as it oscillates around a horizontal axis. This cumbersome arrangement produces fittings at a relatively low rate, particularly for fittings of relatively small diameter.

SUMMARY OF THE INVENTION

This invention provides apparatus and methods for high speed winding of a band of resin-coated continuous glass fiber reinforcements helically around cylindrical mandrels and mandrels with nonlinear axes to produce pipe fittings, such as elbows, of maximum circumferential and axial strength at low labor and material costs. The method and apparatus may be fully mechanized to increase production and minimize labor costs.

In terms of apparatus for making pipe fittings with nonlinear axes, the invention includes a spindle mounted to rotate about a longitudinal axis. An outwardly extending bracket secured to the spindle carries a mandrel support and means for securing a mandrel to the support. Means are provided for simultaneously moving the bracket and the support back and forth laterally and longitudinally as the spindle rotates. Preferably, the mandrel support is rotatable back and forth relative to the bracket about an axis transverse to the axis of spindle rotation so the mandrel can be oscillated or rocked to keep the longitudinal axis of the mandrel substantially tangent to the axis of spindle rotation at a winding station as the mandrel rotates with the spindle about the spindle longitudinal axis. Means are also provided for winding resin-coated filaments in a helical pattern around the mandrel at the winding station as the spindle rotates, the support moves back and forth laterally and longitudinally, and the mandrel oscillates. Thus, the mandrel can be oscillated back and forth along its entire length past the winding station to keep the longitudinal axis of the mandrel at the winding station substantially tangent to the axis of spindle rotation. This operation is continued as long as necessary to build up overlapping layers of resin-coated filaments until the fitting formed on the mandrel has the desired wall thickness. The filaments are then cut, the mandrel removed from its support, and the resin cured. Thereafter, the mandrel, which may be made of a frangible, or water-soluble, casting material, is removed by dissolving or breaking it out of the cured fitting.

In a preferred embodiment, the bracket includes a pair of parallelograms connected together and to the spindle so that as the parallelograms are actuated, they move a mandrel support along an arcuate path having a radius of curvature which matches that of the longitudinal axis of the mandrel or pipe fitting to be formed. In one form, a first bell crank, having two arms joined at an apex, is connected by first pivot means at one end of one arm of the first bell crank to the spindle. A second bell crank, having two arms joined at an apex, is connected at its apex by second pivot means to the apex of the first bell crank. Third pivot means connects one end of a first link to the other arm of the first bell crank. Fourth pivot means connects the other end of the first link to one end of a second link, which carries a mandrel support. Fifth pivot means connects the other end of the second link to one arm of the second bell crank. Means are provided for securing the mandrel to the support. Sixth pivot means connects one end of a third link to the spindle. Seventh pivot means connects the other end of the third link to the other arm of the second bell crank so that two interconnected parallelograms are formed, with one side of one of the parallelograms rigidly attached to the spindle.

All parts of the bracket connected together by pivot means are rotatable relative to each other about respective axes extending through those pivot means transverse to the longitudinal axis of spindle rotation.

Means are provided for oscillating the third link and the first bell crank about the sixth and first pivots, respectively, to cause the parallelograms to move the mandrel support laterally and longitudinally with respect to the spindle longitudinal axis, and oscillate the mandrel support on the second link about the fifth pivot as the spindle rotates.

Preferably, a pair of longitudinally spaced arcuate guide fingers are disposed around the longitudinal axis of the spindle at the winding station so that the resin-coated filaments pass between the two fingers as the spindle rotates to wind the filaments in a helical pattern around the mandrel. Depending on which direction the mandrel moves longitudinally, the filaments slide over one or the other of the two fingers. Moreover, the position of the band of filaments on the curved fingers shifts laterally with respect to the longitudinal axes of the filaments during the winding operation to change the amount by which the filaments lag from the curved fingers. "Lag" is the distance between the curved fingers and the points of tangency of the band of filaments on the mandrel. Thus, the change in lag varies the apparent rocking velocity of the mandrel, although the actual rocking velocity may remain constant. Additionally, the shifting of the band of filaments laterally on the curved fingers during the winding operation varies the apparent rotational rate of the mandrel relative to the position of the band of filaments on the fingers. These two effects result in a surprising automatic compensation that produces a nearly geodesic filament path on the mandrel, even though the mandrel is oscillated and rotated at constant rates. The curved finger delivery system also automatically varies the filament band width in response to changing helix angle as the band is applied first to the inside and then to the outside curvature of the mandrel. This provides complete coverage of the torus portion of the mandrel without excessive overlapping, which would be produced by a band that remained constant in width around the full circumference of the mandrel.

If a fitting with generally cylindrical ends is required, the ends are helically wound by stopping the oscillation of the mandrel, but continuing its rotation about the longitudinal axis of the spindle, and moving the filament guide fingers parallel to the axis of rotation to continue the helical filament path from the curved portion of the mandrel onto and along the cylindrical portion. On reaching the outer end of the cylindrical portion, the fingers stop and move back to their original position so the winding around the arcuate part of the mandrel can be continued. This same operation can be used to make pipe.

Preferably, the mandrel support is secured as a cantilever to the bracket and includes a base with an outwardly extending stud adapted to extend through a hollow mandrel. A spring-loaded cap secured to the outer end of the stud clamps the mandrel to the base so the end of the mandrel remote from the base is free.

The motion of the spindle and the various linkages which comprise the total mechanism may be mechanically synchronized, or they may be driven by numerical control units. Numerical control provides more versatility and greater ease of changeover of the apparatus than with mechanical synchronization. Preferably, the parallelograms which make up the bracket are dimensioned to provide sufficient clearance around the mandrel so that materials can be delivered from a common source to mandrels of various diameters and radii. Clearance is maximized by supporting the mandrel from only one of its ends and by locating the linkage as much as possible to one side of the mandrel. Preferably, the linkage of the parallelograms is adjustable to accommodate elbow mandrels of various sizes and radii. Adjustment is made by rotation of linkage elements relative to one another, together with change of mandrel support configuration. Linkage design also permits driving links to undergo identical rotations in oscillating mandrels of all sizes and radii, thereby minimizing the forces and moments acting on the links. A simple, fixed counterbalance minimizes static and dynamic linkage-actuating forces.

In terms of method for making a pipe fitting having a nonlinear longitudinal axis, the invention includes the step of securing one end of the mandrel to a cantilever support with one end of the mandrel adjacent a winding station. The mandrel has an exterior shape which matches the interior surface of the fitting to be produced. The mandrel is rotated about an axis substantially tangent to the nonlinear axis at the winding station, and the rotating mandrel is moved back and forth through the winding station while maintaining the nonlinear axis substantially tangent to the axis of rotation at the winding station. Resin-coated filaments are wound around the mandrel in a helical pattern as the mandrel moves back and forth through the winding station. Preferably, the helix angle of the filaments is between about 30° and about 70°. The helix angle is the angle between the longitudinal axes of the filaments and the longitudinal axis of the pipe fitting.

BRIEF DESCRIPTION OF THE DRAWINGS

FIG. 3 is a view taken on line 3—3 of FIG. 1;

FIG. 4 is a schematic elevation of an alternative embodiment of the invention;

FIG. 5 is a view taken on line 5—5 of FIG. 4;

FIG. 6 is an elevation of the presently-preferred embodiment of the invention;

FIG. 6A is an enlarged view in the area of 6A—6A of FIG. 6;

FIG. 7 is a view taken on line 7—7 of FIG. 6;

FIG. 8 is a view taken on line 8—8 of FIG. 6;

FIG. 9 is an end elevation of a carriage arrangement for moving the guide fingers and to form a cylindrical portion of a fitting;

FIG. 10 is a view taken on line 10—10 of FIG. 9;

FIG. 11 is a view taken on line 11—11 of FIG. 10;

FIG. 12 is a view taken on line 12—12 of FIG. 6 of the presently-preferred embodiment for securing a mandrel to a support in a cantilever arrangement;

FIG. 14 is a view taken on line 14—14 of FIG. 12;

FIG. 15 is a view taken on line 15—15 of FIG. 8;

FIG. 16 is a view taken on line 16—16 of FIG. 8; and

DETAILED DESCRIPTION

Figure 1:
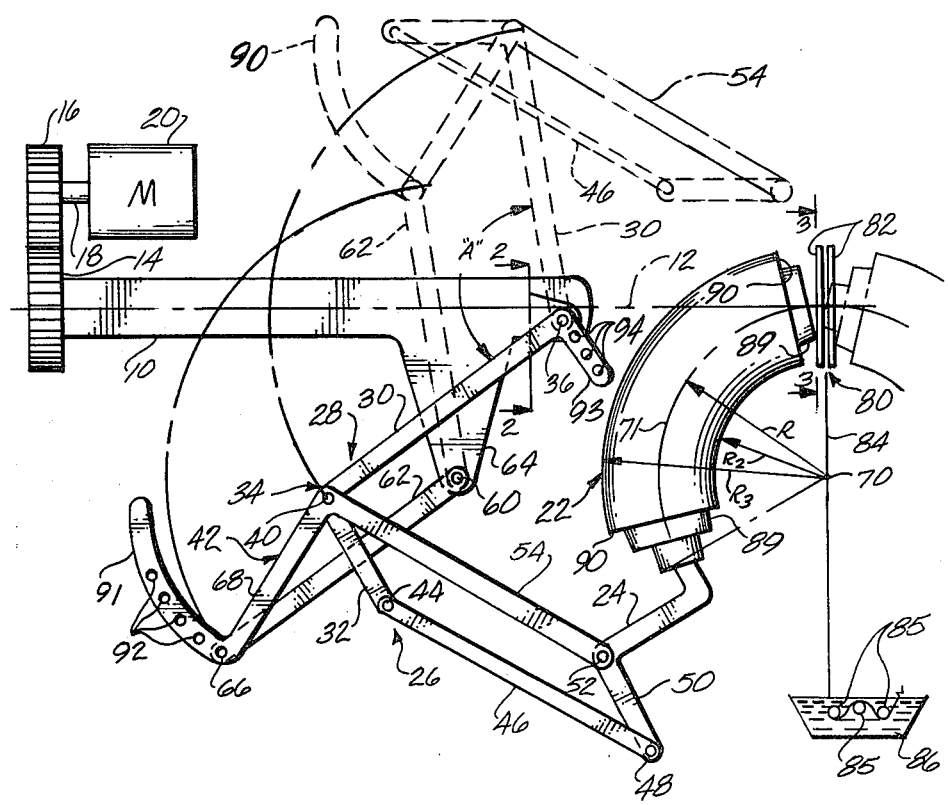
FIG. 1 is a schematic elevation of one form of the invention.

Referring to FIG. 1, an elongated shaft or spindle 10 mounted in suitable bearings (not shown) rotates about a horizontal longitudinal axis 12. The spindle is driven in any suitable manner, such as by a driven spur gear 14 secured to the spindle and engaging a driving spur gear 16 on a shaft 18 turned by an electric motor 20.

One end of a hollow mandrel 22, which may be a segment of a toroid, is secured to a mandrel support 24 carried on the outer end of a bracket 26 secured to the spindle to rotate about the longitudinal axis 12.

The bracket 26 includes a first bell crank 28 having a first arm 30 and a second arm 32 joined at an apex 34. A first pivot pin 36 connects the end of arm 30 remote from the apex of the first bell crank to the spindle so the arm may oscillate about the first pivot on an axis perpendicular to the longitudinal axis of rotation of the spindle. A second pivot pin 40 connects the apex of a second bell crank 42 to the apex of the first bell crank so the two bell cranks can rotate relative to each other about an axis perpendicular to the longitudinal axis of spindle rotation. A third pivot pin 44 connects one end of a first link 46 to the end of the second arm 32 of the first bell crank remote from the apex so that the first link and second arm 32 can rotate with respect to each other about an axis perpendicular to the longitudinal axis of the spindle.

A fourth pivot pin 48 connects the other end of the first link to one end of a second link 50 so the two links can rotate relative to each other about an axis perpendicular to the longitudinal axis of the spindle. A fifth pivot pin 52 connects the other end of the second link to one end of a first arm 54 of the second bell crank so the second link and the first arm 54 of the second bell crank can rotate relative to each other about an axis perpendicular to the longitudinal axis of the spindle. A sixth pivot pin 60 connects one end of a third link 62 to an outwardly extending web 64 formed integrally with the spindle. The third link is rotatable about the sixth pivot pin around an axis perpendicular to the longitudinal axis of the spindle.

A seventh pivot pin 66 connects the other end of the third link to the outer end of a second arm 68 of the second bell crank so the second arm 68 and third link can rotate relative to each other about an axis perpendicular to the longitudinal axis of the spindle. The mandrel support 24 is rigidly connected at its inner end to the second link 50 adjacent the fifth pivot pin 52. The outer end of the support is rigidly connected by any suitable means (such as that described below with respect to FIGS. 12-14) to one end of the mandrel 22.

The linkages just described form bracket 26, which includes two interconnected parallelograms, the first of which is connected along one of its sides to the spindle at the first and sixth pivot pins 36 and 60, respectively. The remainder of the first parallelogram includes the first arm 30 of the first bell crank, the second arm 68 of the second bell crank, and the third link 62. The second parallelogram includes the second arm 32 of the first bell crank 28, the first link 46, the second link 50, and the first arm 54 of the second bell crank 42.

The mandrel support 24 in FIG. 1 is caused to move laterally and longitudinally with respect to the longitudinal axis of the spindle about an artificial center 70 along an arc 71 of radius R. The arc is coincident with the arcuate longitudinal axis of the mandrel, the outer surface of which is a segment of a toroid having an inside radius $R_2$ and an outside radius $R_3$. The artificial center 70 is at the intersection of a line which passes through the fifth pivot pin 52 parallel to first arm 30 of the first bell crank, and a line which passes through the first pivot pin 36 parallel to the first arm 54 of the second bell crank. Thus, artificial center 70 is at one corner of a third parallelogram with three other corners at pivot pins 36, 40, and 52.

The linkage which makes up the bracket 26 can be operated by any of several suitable mechanisms. For example, as shown in FIG. 2, the first pivot pin 36 extends through the spindle 10 and is connected to a driven spur gear 72, which engages a driving spur gear 74 connected to a drive shaft 76 of an electric motor 78 supplied power by slip rings (not shown) in a manner well known to those skilled in the art.

Preferably, the motors 20 and 78 are driven by programmed 3-axis numerical control units (not shown) in a manner well known to those skilled in the art so that as the spindle rotates continuously in one direction, the mandrel oscillates back and forth around center 70 and past a winding station 80, where a pair of arcuate and longitudinally spaced guide fingers 82 are mounted as described in more detail with respect to FIGS. 9-11. A band 84 of resin-coated glass fibers passes up between the fingers and is wrapped around the mandrel in overlapping helical patterns as the mandrel rotates about the longitudinal axis of the spindle and oscillates back and forth past the winding station. The parallelograms which make up the bracket, and the mandrel support, are dimensioned and connected so the arcuate longitudinal axis of the mandrel at the winding station is substantially tangent to the axis of spindle rotation at all times as the mandrel oscillates back and forth through the guide fingers.

Figure 2:
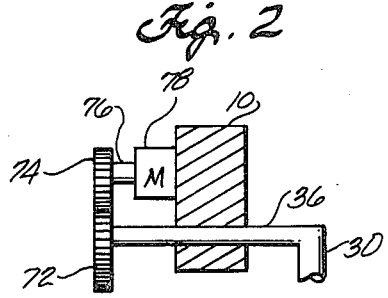
FIG. 2 is a view taken on line 2—2 of FIG. 1.

As shown best in FIG. 2, the pivot pin 36 is formed integrally with the first arm 30 of the first bell crank so that as the motor 78 rotates first in one direction and then in the other, the first arm 30 of the first bell crank oscillates through angle "A" around first pivot pin 36 between the solid line position to the phantom line position shown in FIG. 1. The third link 62 oscillates through the same angle as it pivots about the sixth pivot pin 60. If desired, a drive motor could be connected to drive the third link 62 simultaneously with the first arm 30 of the first bell crank.

Thus, the parallelogram connected to the spindle first rotates in a clockwise direction about pivot pins 36 and 60 to the phantom line position shown in FIG. 1. This carries the second parallelogram up to the phantom line position of FIG. 1. During this movement, the second arm 32 of the first bell crank and the second link 50 rotate in a clockwise direction about third and fourth pivot pins 44 and 48, respectively, to the phantom line position shown in FIG. 1, and the mandrel passes from left to right (as viewed in FIG. 1) through the guide fingers 82 while rotating about spindle axis 12. This causes the band of rovings to be wrapped around the mandrel in a helical pattern.

After the bracket 26 reaches the dotted line position shown in FIG. 1, and after the desired dwell time in this position, the motor 78 is reversed, and the linkage returns to the solid line position. Thus, the mandrel simultaneously rotates about the axis of spindle rotation and oscillates about artificial center 70 between the solid and the phantom line positions shown in FIG. 1.

Proper synchronization of the speed of spindle rotation and the oscillation of the mandrel past the winding station wraps the resin-saturated glass fibers around the mandrel in the desired pattern, and preferably at a helix angle between about 30° and about 70°. By controlling the dwell time of the mandrel at the end of each oscillation, the helical patterns can be laid down to overlap and cover the mandrel with a uniform thickness that depends upon the number of passes the mandrel makes back and forth past the winding station.

As can be seen from FIG. 1, the linkage used in bracket 26 and the offset support for the mandrel permits the winding station to be located well away from the linkage, thereby avoiding dripping or spattering resin on the linkage during the winding operation. Moreover, there is ample room for mounting the guide fingers and delivering the resin-coated fibers to the winding station.

On the way to the winding station, the band of rovings of glass fibers pass around guide rods 85 submerged in a liquid bath 86 of thermosetting resin, such as epoxy, polyester, phenol-formaldehyde, or the like, or a thermoplastic resin, such as polyvinyl chloride or the like. A comb (not shown), which may be conventional, ahead of the bath aligns the dry rovings into a smooth, flat band before they enter the resin bath. The wetted rovings, coated and impregnated with liquid resin, leave the bath at a converging angle "B" (FIG. 3). As the mandrel moves from the solid to the phantom line position, the band of resin-coated rovings slides over the lower portion of the forward (right, as viewed in FIG. 1) guide finger, as shown in FIG. 3. The two guide fingers are identical. Each is about 180° segment of a circle (preferably a rod of circular cross-section bent into the shape shown in FIG. 3), which makes a close concentric fit around the lower half of the mandrel at the winding station. The rings are mounted on a delivery arm 87, described in more detail below with respect to FIGS. 9-11 below.

As shown in FIG. 1, the mandrel includes a section 89 of reduced diameter at each end to provide a turnaround shoulder 90, around which the band of rovings is hooked when the mandrel reverses direction. The guide fingers concentrate the rovings to converge at the angle "B", which is the same angle subtended by the leading and trailing edges of the band around the longitudinal axis of the mandrel because of the concentric arrangement of the guide fingers, the o.d. of the mandrel, and the o.d. of the reduced section 89. For example, if the radius of the reduced section 89 is 2.0 arbitrary units, that of the mandrel 2.3, and that of the guide finger 2.8, the band subtends the same angle on the guide finger, the mandrel, and the reduced section. When the winding direction reverses, the band transfers from the forward to the rear (left, as viewed in FIG. 1) guide finger and follows a configuration which is the mirror image of that just described with respect to FIG. 3.

After the mandrel is wrapped with the required amounts of rovings, the rovings are cut, the mandrel removed, and the resin cured by the application of heat or other suitable energy. Thereafter, the mandrel, which is made of a water-soluble, frangible coating material, is removed by dissolving or fragmentation.

In most wrapping operations, the resin-coated fibers deliver an excess of resin to the mandrel. Rotation of the mandrel slings off the excess, which may be collected by deflectors (not shown) and directed into the resin bath for immediate reuse. This is not practical with prior art machines where the mandrel is not rotated.

To adjust the bracket for mandrels of different sizes, an arcuate extension 91 (FIG. 1) integral with the outer end of the second arm 68 of the second bell crank includes a plurality of transverse holes 92 located on a circular arc with its center at the second pivot pin 40. The extension permits the location of seventh pivot pin 66 to be changed to accommodate mandrels of different sizes. For example, if an elbow with a longitudinal axis of a smaller radius of curvature than R is to be made, the seventh pivot pin 66 is removed, the second bell crank rotated in a counterclockwise direction (as viewed in FIG. 1) about the second pivot pin 40 to the required position, shifting artificial center 70 to the point which will accommodate a mandrel with a smaller radius of curvature. The seventh pivot pin 66 is then placed in a new hole 92, a mandrel support of the proper size is substituted for the one shown in FIG. 1, and the apparatus is ready for producing an elbow with the reduced radius of curvature. If the angles between adjacent sides of the parallelograms in the arms are to be kept the same as shown in FIG. 1, then the first arm of the first bell crank at the first pivot pin 36 is provided with an integral arcuate extension 93 with holes 94 located on a circular arc with its center at the second pivot pin 40 to permit the first bell crank to be rotated about the second pivot pin 40 to restore the angles between adjacent sides of the parallelograms to the original configuration. Thus, the angles between adjacent sides can be optimized to minimize stress on the linkages in the parallelograms as the arm is activated.

Referring to FIGS. 4 and 5, which show another embodiment of the invention, a spindle or crankshaft 100 rotates about a horizontal and longitudinally extending axis 102. A laterally extending web 104, rigidly secured at its inner end to the crankshaft, carries at its outer end a longitudinally extending yoke 106, which includes a crossbar or base 108 perpendicular to the longitudinal axis of the spindle, and a pair of side plates 110 secured at their left (as viewed in FIGS. 4 and 5) ends to opposite ends of crossbar 108 on opposite sides of the longitudinal axis of spindle rotation.

A U-shaped frame 112 within the yoke 106 rotates about trunions 114 journaled through the right (as viewed in FIGS. 4 and 5) ends of the side plates 110 to rotate about collinear axes perpendicular to the longitudinal axis of the spindle. A pair of frame arms 116 rigidly secured at their left (as viewed in FIGS. 4 and 5) ends to opposite ends of a transversely extending base 118 of the frame 112 on opposite sides of the axis of spindle rotation extend parallel to that axis and are rigidly secured at their right (as viewed in FIGS. 4 and 5) respective ends to a trunion 114. A mandrel support 119 on the center of the base 118 is secured to the left (as viewed in FIGS. 4 and 5) end of a mandrel 120, which is oscillated through arcuate guide fingers 121 at a winding station 122 just beyond the right (as viewed in FIGS. 4 and 5) end of the yoke by a motor 124 secured to the outside of one of the plates of the yoke. A driving spur gear 126 connected to a motor shaft 128 engages a driven spur gear 130, which is connected to one of the trunnions journaled through the plate of the yoke on which the motor is mounted. Thus, as the spindle is rotated about its longitudinal axis by any suitable means (not shown), the mandrel oscillates between the solid and phantom line positions of FIG. 4 past the winding station to lay down a helical wrap of resin-impregnated glass fibers (not shown) on the mandrel. After the pipe fitting is formed, the resin-coated glass fibers are cut, the mandrel is removed from the support, the resin cured by heat or other energy to form a solid plastic pipe, and the mandrel removed from the pipe by dissolving or disintegrating it.

Although the apparatus shown in FIGS. 4 and 5 can be used to make pipe fittings in accordance with this invention, it has the disadvantage that the center about which the mandrel rocks is located fairly close to the winding station, resulting in some dripping and spattering of resin on the apparatus.

Referring to FIGS. 6, 7 and 8, which show the presently preferred embodiment of the invention, an annular spindle 201 journaled through an upright support 202 rotates about a horizontal longitudinal axis 204. An electric spindle motor 206 is connected to the input (not shown) of a gear box 208 on the upper end of the support 202. The output shaft 209 of the gear box is connected to a driving sprocket 210, which is connected by a chain 212 to a driven sprocket 214 on the left (as viewed in FIGS. 6 and 7) end of the annular spindle.

An elongated and longitudinally extending beam 220 is secured at its left (as viewed in FIGS. 6 and 7) end to the spindle to be laterally offset from the axis of spindle rotation. The inner end of an outwardly extending first arm 222 of a first bell crank 223 is journaled around a stub shaft 224 secured to the right (as viewed in FIG. 7) end of the beam to extend perpendicular to and across the axis of spindle rotation. The stub shaft 224 serves as a fulcrum about which the first arm 222 can oscillate with respect to the spindle.

Bolts 225, extending through a clamp ring 225A and arcuate slots 225B (FIG. 15) in the outer end of the first arm 222 of the first bell crank 223, secure the outer end of first arm 222 to one end of a hollow second pivot pin 230. Bolts 225C secure the inner end of a second arm 226 to the other end of second pivot pin 230, which forms the apex of the first bell crank 223 and of a second bell crank 232 mounted on the second pivot pin 230 between the arms of the first bell crank so the first and second bell cranks are rotatable with respect to each other about an axis perpendicular to the axis of spindle rotation.

A third pivot pin 234 connects the left (as viewed in FIGS. 6 and 7) end of a horizontal and longitudinally extending first link 236 to the end of the second arm 226 of the first bell crank remote from the apex so that the first link and second lever of the first bell crank are free to rotate with respect to each other about an axis perpendicular to the axis of spindle rotation. A fourth pivot pin 237 connects the right (as viewed in FIG. 6) end of the first link 236 to one end of a second link 238 so the two links are rotatable with respect to each other about the axis of the fourth pivot pin, which is perpendicular to the axis of spindle rotation. A fifth pivot pin 240, formed integrally with the other end of the second link 238, is journaled through the right (as viewed in FIGS. 6 and 7) end of a horizontal and longitudinally extending first arm 242 of the second bell crank 232 so the second link 238 and arm 242 are free to rotate with respect to each other about an axis perpendicular to the axis of spindle rotation.

A sixth pivot pin 244 connects one end of a third link 246 to a plate 248 rigidly secured by bolts 249 (FIG. 8) to the outer end of the stub shaft 224. A seventh pivot pin 250 secures the other end of the third link 246 to the end of a second arm 252 of the second bell crank 232 remote from the bell crank apex. The sixth and seventh pivot pins are perpendicular to the axis of spindle rotation. Accordingly, the third link 246 is free to rotate with respect to the plate and the second arm of the second bell crank about respective axes perpendicular to the axis of spindle rotation.

As shown best in FIG. 8, pivot pin 230 is journaled through the ends of arms 242 and 252 at the apex of the second bell crank 232. Bolts 254, extending through clamp ring 255 and arcuate slots 256 (FIG. 16) in arm 242, secure the adjacent ends of arms 242 and 252 together to form the second bell crank 232.

A cantilever mandrel support 260 (FIGS. 7 and 12) is secured to a flange 261 on the end of the fifth pivot pin 240 journaled through the arm 242. A hollow mandrel 262, around which resin-coated fibers 264 are to be wrapped to form a plastic pipe elbow, is secured to the mandrel support as described below. The outer surface of the mandrel is a 90° segment of a toroid with short, enlarged, cylindrical sectoions 266 adjacent short cylindrical "turnaround" ends 267 of reduced diameter.

The arms, links, and pivot pins just described form a bracket 268 which, in the position shown in FIGS. 6 and 7, supports one end of the mandrel between a pair of vertical, longitudinally spaced, arcuate guide fingers 269 mounted on the upper end of an upwardly extending delivery arm 270, described in more detail with respect to FIGS. 9-11. The guide fingers define a winding station 272, where the resin-coated glass fibers wind around the mandrel in a helical pattern as it rotates about the axis of spindle rotation and oscillates past the winding station as described in detail below. The longitudinal axis of the mandrel in tangent to the axis of spindle rotation at the winding station.

The right (as viewed in FIGS. 6 and 7) end of a substantially horizontal push rod 280 is connected through a first universal joint 282 to a pivot pin 283 to one end of a push lever 284, the other end of which is formed integrally with the end of the first arm 222 of the first bell crank 223 journaled around the stub shaft 224. The left end of the push rod is connected through a second universal joint 286 and a pivot pin 288 to the periphery of a partial disk 290 mounted on a support 292 to oscillate about a horizontal axis perpendicular to the axis of spindle rotation. A disk drive motor 294 on the mount 292 is connected to oscillate the disk by first rotating it in a clockwise (as viewed in FIG. 6) direction through an angle of 90°, momentarily stopping the disk, and then rotating it 90° in a counterclockwise direction. After a brief pause, the cycle is repeated.

A disk brake 296 at the lower periphery of the disk is actuated to hold the disk and linkage of the bracket 268 in a fixed position when the apparatus is not in use. The disk brake and its operation may be conventional.

As explained more fully below, oscillation of the disk reciprocates the push rod, which actuates the linkage in the bracket 268 to oscillate the mandrel support 260 about an artificial center 297 along an arc coincident with the longitudinal axis of the mandrel. Referring to FIG. 6, artificial center 297 is at the intersection of a line which passes through stub shaft 224 parallel to arm 242 and a line which passes through pivot pin 240 parallel to arm 222.

As shown in FIGS. 9–11, the guide fingers 269 are mounted on the upper end of the delivery arm 270, which extends downwardly and outwardly and is secured at its lower end to a horizontal carriage 302 mounted to travel back and forth parallel to the axis of spindle rotation. A first pair of collinear bushings 304 (FIG. 11) on the inner end of the carriage 302 is secured to opposite sides of the carriage 302 to make a close, sliding fit around an inner horizontal rail 305 supported at its opposite ends in upright blocks 306 mounted on a horizontal base 308. A second pair of collinear bushings 310 on the outer end of the carriage 302 make a close, sliding fit around an outer horizontal rail 312, which is parallel to the inner rail 305 and supported at its ends by vertical blocks 314 mounted on the base 308.

A drive chain 320, secured at one end by a first clamp 322 to one side of the carriage 302, extends horizontally around a first idler sprocket 324 mounted at the right (as viewed in FIG. 11) end of the base to rotate about a horizontal shaft 326 perpendicular to the guide rails. The chain extends around a second idler sprocket 328 on a support 329 under the carriage, around a drive sprocket 330 on a drive shaft 332 from a gear box 334, and back to the opposite side of the carriage, where it is secured by a second clamp 336. A pulse motor 338 connected to the input shaft 339 of the gear box supplies power to move the carriage and finger guides as required between the two phantom line positions shown in FIG. 10 as described below. A pair of shock absorbers 340 mounted in the path of the carriage at opposite ends of the base avoid damage to the equipment if the carriage should overrun its intended position. Limit switches 342 mounted in the path of the carriage turn off the pulse motor when the carriage reaches the end of its travel in either direction.

As viewed in FIG. 9, the mandrel 262 rotates in a clockwise direction, and the arcuate guide fingers make a close fit around the lower 180° of the outside diameter of the mandrel. The band of glass fibers is coated with resin and applied to the mandrel as described above with respect to FIGS. 1–3.

Figure 13:
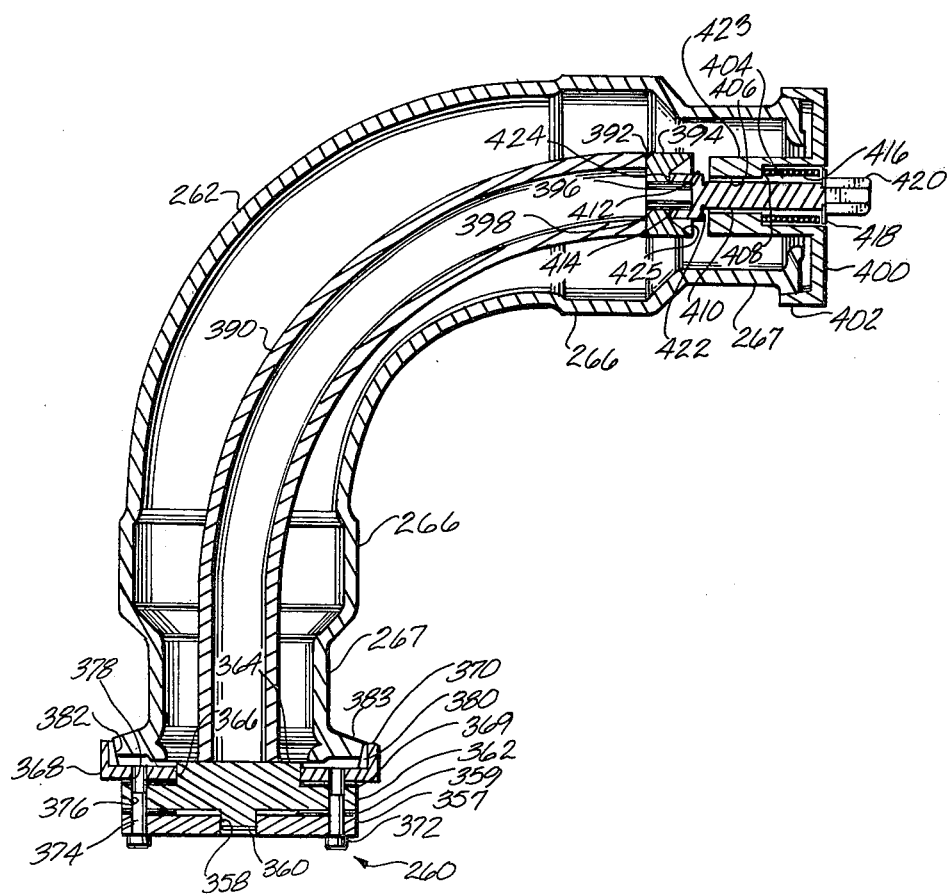
FIG. 13 is a view taken on line 13—13 of FIG. 12.

Referring to FIGS. 12–14, the mandrel support 260 includes a transverse horizontal shaft 350 with an outwardly extending flange 352 on one end secured by bolts 354 to the flange 261 on the fifth pivot pin 240. A master shim 355 between flanges 261 and 352 corrects for all machining tolerances up to this point, as measured from the spindle. A vertical plate 356 welded to the other end of the shaft 350 carries a horizontal shelf 357, which has a central bore 358 (FIG. 12) through it. A downwardly extending circular boss 360 on the underside of a horizontal base 362 makes a close slip fit in bore 358 so horizontal base 362 rests on shims 359 between the base and shelf 357. An upwardly extending circular boss 364 on the upper side of the base 362 makes a close slip fit into a central bore 366 of a annular retainer ring 368, which rests on shims 369 between the ring and base. The ring has an upwardly extending peripheral wall 370. Bolts 372, extending up through collinear bolt holes 374 and 376 in the shims, the shelf 357, and the base 362, are threaded into internally threaded bores 378 in the retainer ring to clamp the base in the position shown in FIG. 13. The shims between the shelf and the base, and the base and the retainer, permit the mandrel 262 to be positioned exactly as required.

As shown best in FIGS. 12 and 13, a nylon drive chuck 380 has a circular periphery which makes a close, sliding fit inside the upright wall 370 on the retainer. The chuck includes a square central opening 382, which receives the lower (as viewed in FIG. 13) section 383 of the mandrel. Section 383 has a square periphery which makes a close, sliding fit within the square opening in the drive chuck. As shown best in FIG. 12, the square opening 382 of the chuck 380 and the square end of section 383 each have downwardly and inwardly inclined walls so the mandrel is firmly supported around the entire periphery of the chuck with the lowermost portion of the mandrel spaced just above the upper surface of the retainer 368. The nylon chuck has four bores 384 (FIG. 13) extending through it at 90° intervals to receive four upwardly extending dowel pins 385 on the retaining ring to prevent the chuck from slipping relative to the mandrel support.

An upwardly extending hollow stud 390, which has a square cross-section, is welded at its lower end to the upper surface of the upper boss 364 on the base. The stud curves to follow generally the longitudinal axis of the mandrel. The stud terminates in a horizontal (as viewed in FIG. 13) end 392, which is closed by a square plug 394 welded to it. An externally threaded nipple 396 is press-fitted into a bore 398 in the center of the plug 394.

An annular cap 400 with an annular peripheral lip 402, which makes a snug fit around the right (as viewed in FIG. 13) end of the mandrel, has a bore 404 extending through it. The left (as viewed in FIG. 13) of the bore 404 is stepped down to a reduced diameter at 406 to provide an inwardly extending shoulder 408. A bolt 410 makes a sliding fit within the bore through the cap. The left end of the bolt includes an enlarged section 412, which has an internally threaded recess 414 adapted to mate with the right (as viewed in FIG. 13) end of the externally threaded nipple 396. A compression spring 416 in the enlarged portion of bore 404 bears against shoulder 408, and is held in place by a retaining washer 418 under a head 420 formed integrally with the bolt. Thus, the bolt can be threaded onto and removed from the threaded nipple by rotating the bolt head 420. When the cap 400 is removed by unthreading the bolt from the nipple, the compression ring expands, urging the bolt to the right (as viewed in FIG. 13) until an outwardly extending shoulder 422 on the enlarged section 412 of the bolt bears against the left (as viewed in FIG. 13) end of an annular boss 423 on the cap.

To set the mandrel in position for winding resin-coated glass fibers around it, the cap and bolt are removed, and the mandrel is slipped over the stud 390 into the position shown in FIG. 13, so the square end of the mandrel makes a snug, firm fit in the nylon drive chuck of the mandrel support. The cap is placed over the right (as viewed in FIG. 13) end of the mandrel, and the bolt threaded onto the nipple until the bolt bottoms on shoulder 424 in a tapered recess 425 of the plug 394. This pulls the cap into a snug fit over the mandrel, which is thus firmly clamped in and supported by the nylon drive chuck with a force set by the spring.

With the mandrel mounted at only one end on the cantilever mandrel support, as shown in FIGS. 6, 7, and 13, an elbow is formed by securing the band 264 of resin-coated glass fibers to the turnaround end portion 267 on the end of the mandrel disposed between the two delivery guide fingers 269. A numerical control unit (not shown) is actuated to turn on spindle motor 206 to rotate the spindle, bracket, and mandrel about longitudinal axis 204. Simultaneously, pulse motor 338 (FIG. 11) is turned on to move the carriage 302 and guide fingers 269 to the left (as viewed in FIG. 6). This causes the band of resin-coated glass fibers to be wrapped in a helical pattern around the turnaround end 267 and the cylindrical section 266 of the mandrel. The band of resin-coated fibers is engaged by the right (as viewed in FIG. 6) guide finger during this part of the operation to gather and concentrate the fibers as previously described above with respect to FIG. 3.

As the right guide finger approaches the inner end of the cylindrical section 266 of the mandrel, the pulse motor 338 slows to a stop, and simultaneously disk drive motor 294 turns on to rotate the partial disk 90° in a clockwise direction (as viewed in FIG. 6). The stopping of the pulse motor 338 and the starting of the disk drive motor 294 are synchronized so that the relative longitudinal movement of the trailing guide finger 269 and the mandrel remains substantially constant as the pulse motor 338 stops, and disk drive motor 294 achieves full speed. The rotation of the partial disk 290 moves horizontal push rod 280 to the right (as viewed in FIG. 6), causing push lever 284 to rotate arm 222 in a clockwise direction about stub shaft 224 through an angle of 90°. This causes the third link 246 to rotate about pivot pin 244 90° in a clockwise direction. Pivot pin 230 and the first and second bell cranks mounted on it are also lifted during this part of the operation. The arms 242 and 252 of the second bell crank 232 remain parallel to their original directions as they are lifted. Second arm 226 of the first bell crank rotates in a clockwise direction relative to second arm 252 of the second bell crank, causing link 236 to move horizontally and to the right (as viewed in FIG. 6) relative to the horizontal arm 242 of the second bell crank 232. This causes the second link 238 to rotate in a clockwise direction about the axis of the fifth pivot pin 240 formed integrally with the lower end of link 238. The flange 261 on pivot pin 240 also rotates in a clockwise direction with pivot pin 240 and causes the mandrel support to rotate as the bracket 268 is lifted. Thus, the mandrel support moves laterally and longitudinally relative to the spindle as the push rod moves. Moreover, the arms and links which make up the bracket are proportioned so that the mandrel moves past the guide fingers 269 with the longitudinal axis of the mandrel always tangent to the axis 204 of spindle rotation.

As the cylindrical portion 266 on the left (as viewed in FIG. 6) end of the mandrel reaches the winding station between the two guide fingers, the disk drive motor 294 slows to a stop and holds the horizontal push rod 280 in the position to which it was moved as the partial disk 290 rotated 90° in a clockwise direction from the position shown in FIG. 6. As the disk drive motor 294 stops, the pulse motor 338 (FIG. 11) again turns on to move the guide fingers from right to left (as viewed in FIG. 6) as the cylindrical portion 266 of the mandrel enters the winding station. The pulse motor 338 picks up speed as the disk motor loses speed so that the relative longitudinal movement between the mandrel and the guide fingers remains constant. After the right (as viewed in FIG. 6) guide finger 269 moves the resin-coated fibers onto the reduced turnaround section 267 of the mandrel, the pulse motor 338 stops, and its direction reverses so that the guide fingers move from right to left (as viewed in FIG. 6). The resin-coated fibers now engage the left (as viewed in FIG. 6) guide finger as the carriage and guide fingers move from right to left. As the left guide finger approaches the inner end of the cylindrical section 266 of the mandrel, the pulse motor slows to a stop, and the disk drive motor 294 turns on so the partial disk 290 rotates in a counterclockwise direction back to the position shown in FIG. 6. Once again, the stopping of the pulse motor 338 and the carriage for the guide fingers is synchronized with the acceleration of the disk drive motor 294 so that the relative longitudinal movement between the mandrel and the disk fingers remains substantially constant.

As the disk rotates in the counterclockwise direction, the push rod 280 moves to the left back to the position shown in FIG. 6, and the arms and links in the bracket reverse the movements described above so that the bracket is returned to the position shown in FIG. 6. This causes the mandrel support to move to rotate in a counterclockwise direction about artificial center 297 back to the position shown in FIG. 6. As the inner end of the cylindrical section 266 of the right end of the mandrel approaches the winding station, the disk drive motor 294 slows to a complete stop, and the pulse motor 338 turns on to move the guide fingers from right to left (as viewed in FIG. 6) to cause the band of resin-coated fibers to be wrapped around the cylindrical portion 266 and the turnaround section 267 at the right (as viewed in FIG. 6) end of the mandrel.

The cycle just described above is repeated as many times as necessary to wrap the required number of layers of resin-coated fibers in helical patterns around the mandrel. The dwell time at each end of the mandrel at the winding station can be varied to cause the helical patterns to overlap in any desired manner. Moreover, the numerical control system can be set to wrap the filaments around the mandrel at any desired helix angle, which can vary during the winding operation. Preferably, the helix angle is between about 30° and about 70°, and ideally the filaments follow close to a geodesic path, which for a torus has a helix angle at the outside radius of about 60° and about 40° at the inside radius.

After the mandrel is fully wrapped, all motors stop to bring the mandrel to rest in the position shown in FIG. 6. The wrapped mandrel is removed from the support and placed in an oven to cure the resin to produce a plastic pipe elbow reinforced with glass fibers. Thereafter, the mandrel is removed by dissolving or fragmentation without damaging the plastic pipe fitting.

The operation just described can be used to make pipe, instead of fittings with nonlinear axes. In making pipe, the mandrel is cylindrical for all or most of its length, and the mandrel is rotated about its longitudinal axis. No oscillation is required. If the length of the pipe requires it, the resin bath and supply of filaments are moved back and forth along the axis of the mandrel during the wrapping, or the mandrel may be moved back and forth along its longitudinal axis past the resin bath and supply of filaments.

The position of the artificial center 297 can be shifted to accommodate mandrels of various sizes by loosening bolts 254 (FIG. 8) which clamp the first arm 242 and second arm 252 of the second bell crank 232 together. The first arm 242 can then be rotated in either a clockwise or counterclockwise direction about the second pivot pin 230 so that the bolts 254 occupy new positions in respective arcuate slots 256 (FIG. 16). With the first arm 242 held in the new desired position, bolts 254 are tightened to clamp the first arm 242 in the desired position relative to the second arm 252. If the new position of arm 242 causes an undesirable stress within the parallelogram formed by arm 226, link 236, link 238, and link 242, the relative angle between arms 226 and 222 can be adjusted by loosening bolts 225 (FIG. 8) and rotating arm 226 about the second pivot pin 230 in either a clockwise or counterwise direction until the bolts 225 assume new positions in arcuate slots 225B (FIG. 15). With arm 226 held in the new position, bolts 225 are tightened to clamp arm 226 to be immobile relative to arm 222. Thus, the angles between the arms and links which make up the parallelogram between pivot pins 230, 234, 237, and 240 can be kept constant, or within any desired limits, as the artificial center 297 is adjusted to accommodate mandrels of various sizes.

To provide for static and dynamic balance, a suitable counterweight (not shown) may be attached to the linkage of the bracket 268 to extend to the opposite side of the longitudinal axis of the spindle.

Figure 17:
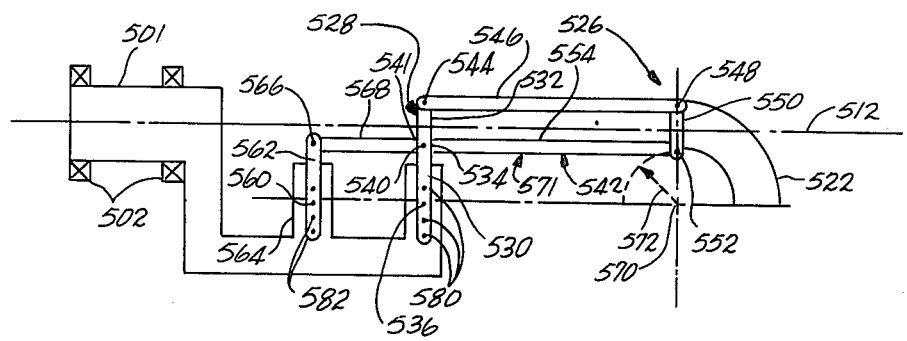
FIGS. 17 and 18 are schematic elevations of alternate embodiments of the invention.

Referring to FIG. 17, which is a schematic elevation of an alternate embodiment of the apparatus of this invention, a spindle 501 journaled in bearings 502 rotates about a horizontal longitudinal axis 512. The spindle is driven in any suitable manner, such as that shown in FIG. 1 or 6. One end of a hollow mandrel 522, which is a segment of a toroid, is mounted on the outer end of a bracket 526 secured to the spindle to rotate about the longitudinal axis 512.

The bracket 526 includes a first bell crank 528 having a first arm 530 and a second arm 532 joined at a juncture 534. A first pivot pin 536 connects the end of arm 530 remote from 534 of the first bell crank to the spindle so the arm may oscillate about the first pivot pin on an axis perpendicular to the longitudinal axis of the rotation of the spindle. A second pivot pin 540 connects the juncture 541 of a second bell crank 542 to the juncture 534 of the first bell crank so the two bell cranks can rotate relative to each other about an axis perpendicular to the longitudinal axis of spindle rotation. A third pivot pin 544 connects one end of a first link 546 to the end of the second arm 532 of the first bell crank remote from the juncture 534 so that the first link and the second arm 532 can rotate with respect to each other about an axis perpendicular to the longitudinal axis of the spindle.

A fourth pivot pin 548 connects the other end of the first link to one end of a second link 550 so the two links can rotate relative to each other about an axis perpendicular to the longitudinal axis of the spindle. A fifth pivot pin 552 connects the other end of the second link 550 to one end of a first arm 554 of the second bell crank so the second link and the first arm 554 of the second bell crank can rotate relative to each other about an axis perpendicular to the longitudinal axis of the spindle. A sixth pivot pin 560 connects one end of a third link 562 to an outwardly extending web 564 formed integrally with the spindle. The third link is rotatable about the sixth pivot pin around an axis perpendicular to the longitudinal axis of the spindle.

A seventh pivot pin 566 connects the other end of the third link to the outer end of a second arm 568 of the second bell crank so the second arm 568 and the third link can rotate relative to each other about an axis perpendicular to the longitudinal axis of the spindle. The mandrel is connected to the second link 550 between the fourth and fifth pivot pins by any suitable means, such as that described above with respect to FIGS. 12–14.

The linkages just described form the bracket 526, which includes two interconnected parallelograms, the first of which is connected along one of its sides to the spindle at the fifth and sixth pivot pins. The remainder of the first parallelogram includes the first arm 530 of the first bell crank, the second arm 568 of the second bell crank, and the third link 562. The second parallelogram includes the second arm 532 of the first bell crank, the first link 546, the second link 550, and the first arm 554 of the second bell crank.

The second link is moved laterally and longitudinally with respect to the longitudinal axis of the spindle about an artificial center 570 along an arc 571 of radius 572. The arc is coincident with the arcuate longitudinal axis of the mandrel. The artificial center 570 is at the intersection of a line which passes through the first and sixth pivot pins, and a line which passes through the fourth and fifth pivot pins 548 and 552, respectively, when they are in the vertical position shown in FIG. 17.

The linkage which makes up the bracket 526 can be operated by any of several suitable mechanisms, such as those in FIG. 2, FIG. 5, or FIGS. 6–8, to cause the center of the second link 550 and the center of the left (as viewed in FIG. 17) end of the mandrel 522 to oscillate 90° along radius 572. A band of resin-coated glass filaments is wrapped around the mandrel in overlapping helical patterns as the mandrel rotates about the longitudinal axis of the spindle and oscillates back and forth past the winding station, all as described in more detail above with respect to FIGS. 1–16.

The first arm 530 of the first bell crank has a series of longitudinal holes 580, which permit the arm to be mounted on the first pivot pin at different locations to vary the effective length of the first arm and change the location of the artificial center 570 to accommodate mandrels of different shapes. The third link 562 also has a series of longitudinally spaced holes 582 so that the second link can be mounted on the sixth pivot pin 560 to vary the effective length of the third link when the position of the artificial center is shifted.

Figure 18:
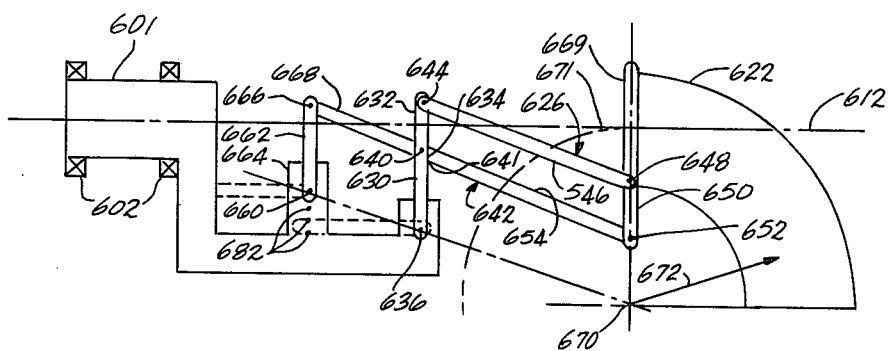

Referring to FIG. 18, a spindle 601, mounted in spindle bearings 602, rotates about a horizontal longitudinal axis 612. The spindle is driven in any suitable manner, such as that described above with respect to FIGS. 1–16.

One end of a hollow mandrel 622, which is a segment of a toroid, is secured to the outer end of a bracket 626 secured to the spindle to rotate about the longitudinal axis 612.

The bracket 626 includes a first bell crank 628 having a first arm 630 and a second arm 632 joined at a juncture 634. A first pivot pin 636 connects the end of arm 630 remote from the juncture 634 of the first bell crank to the spindle. A second pivot pin 640 connects the juncture 641 of a second bell crank 642 to the juncture 634 of the first bell crank so the two bell cranks can rotate relative to each other. A third pivot pin 644 connects one end of a first link to the end of the second arm 632 of the first bell crank remote from the second pivot pin 640 so that the first link and the second arm 632 can rotate with respect to each other.

A fourth pivot pin 648 connects the other end of the first link to one end of a second link 650 so the two links can rotate relative to each other. A fifth pivot pin 652 connects the other end of the second link to one end of a first arm 654 of the second bell crank so the second link and the first arm 654 of the second bell crank can rotate relative to each other. A sixth pivot pin 660 connects one end of a third link 662 to an outwardly extending web 664 formed integrally with the spindle. The third link is rotatable about the sixth pivot pin.

A seventh pivot pin 666 connects the other end of the third link to the outer end of a second arm 668 of the second bell crank so the second arm 668 and third link can rotate relative to each other.

One end of the mandrel is connected to an extension or mandrel support 669 formed integrally with the second link to project beyond the fourth pivot pin 648. The mandrel is secured to the extension 669 by any suitable means, such as that described above with respect to FIGS. 12-14.

The center of the extension or mandrel support 669 is moved laterally and longitudinally with respect to the longitudinal axis of the spindle about an artificial center 670 along an arc 671 of radius 672, which is coincident with the arcuate longitudinal axis of the mandrel. The artificial center is at the intersection of a line which passes through the first and sixth pivot pins 636 and 660, respectively, and a vertical line which passes through fourth and fifth pivot pins 648 and 652 when they are in the extreme right position shown in FIG. 18.

The linkage which makes up the bracket 626 can be operated by any of the several suitable mechanisms described above to cause the third link 662 and the first bell crank 628 to oscillate through an arc of 90° from the upright position shown in FIG. 18 and the horizontal positions shown in phantom line for those elements.

It will be recognized that the linkages shown in FIGS. 17 and 18 are similar to the linkages shown in FIGS. 6-8, except that the first and second bell cranks of the linkages shown in FIGS. 17 and 18 are made up of collinear first and second arms, instead of arms which are disposed at an angle to each other to form an apex.

The artificial center 670 of the linkage shown in FIG. 18 may be adjusted by shifting the sixth pivot pin 660 from the position shown to any one of a series of holes 682 located in the web 664 to extend radially with respect to the axis of spindle rotation. As a matter of fact, the linkage shown in FIG. 18 is a modified version of the linkage shown in FIG. 17, with the linkage shown in FIG. 18 being set to cause the artificial center 670 to be farther from the axis of spindle rotation than is artificial center 570 in the linkage shown in FIG. 17. When the artificial center is shifted, it is necessary to use an appropriate mandrel support, such as the extension 669 formed integrally with the second link of the linkage shown in FIG. 18.

Using the bracket with the linkages shown in the apparatus of FIGS. 1-3 and FIGS. 6-18, and securing the mandrel at only one end to the mandrel support, provides the following advantages:

(1) The mandrel can be supplied an unlimited quantity of resin-coated filaments and be rotated relatively fast about the spindle longitudinal axis to wrap resin-coated continuous fibers around it at a high speed. This is particularly important for producing fittings at an economical rate.

(2) The rotation of the mandrel about the spindle axis slings excess resin off the mandrel and returns it to the resin pot for immediate reuse, and without dripping or spattering on the bracket linkage.

(3) The linkage can be quickly adjusted to accommodate mandrels of different sizes.

The curved finger delivery system for the band of filaments, in combination with the oscillation and rotation of the mandrel, produced surprising and unexpected advantages, which can be better understood from the following discussion. The typical mandrel used in making reinforced thermosetting resin elbows is a section of a torus with end sections which are cylindrical, or approximately so. For the purposes of this explanation, the following definitions apply:

Torus

A torus is a surface of revolution generated by rotating a circle about an axis in its plane with the axis so located that it does not intersect the circle.

Toroid

A toroid is a surface of revolution generated by rotating a plane closed curve about an axis in its plane with the axis so located that it does not intersect the curve. In this discussion, the plane closed curve will be taken to be a circle, so that a toroid and a torus are identical.

Parallel

Sections of a torus perpendicular to its axis are circles called parallel circles, or simply parallels. A parallel of a torus is a line on the torus described by a point on the torus' generating circle as it is rotated to generate the torus.

Meridian

Sections of a torus containing the axis of revolution are called meridian sections, or simply meridians.

Toroidal Helix

A toroidal helix, for purposes of this discussion, is a curve on a torus produced by a point on the generating circle moving at constant angular velocity around the circumference of the generating circle as the generating circle moves at constant angular velocity about the axis of revolution of the torus to generate the torus.

Constant-Angle Helix

A constant-angle helix is, for purposes of this discussion, a curve on the torus generated so that tangents to the curve are at constant angles with tangents to the parallels of the torus, at intersections of the curve and the parallels. Such a curve would be generated by a point on the generating circle moving at constant angular velocity around the circumference of the generating circle and, at the same time, moving at constant linear velocity on the surface of the torus in a direction perpendicular to the meridians.

Geodesic

A geodesic is a curve along which the principal normal coincides with surface normal. Through every point on a surface passes a geodesic in every direction. A geodesic is uniquely determined by an initial point on the surface and a tangent at that point. If a curve of shortest distance exists between two points on the surface, then that curve is a geodesic. A geodesic on a torus would be generated by a point moving around the circumference of the generating circle at constant or variable angular velocity and, at the same time, moving at variable linear velocity on the surface of the torus in a direction perpendicular to the meridians.

For many years, it has been the practice of engineers skilled in the art of filament winding to calculate the physical properties of RTR articles by means of netting analysis. In such calculations, stresses within a filament-wound article are assumed to be carried entirely by the reinforcing filaments along their axes. The binder resin is assumed to distribute loads to the reinforcing filaments, but the strength of the matrix is ignored.

Using netting analysis, the optimum helix angle for reinforcing filaments in a cylindrical, closed-end pressure vessel is 54°45′, measured from a direction parallel to the axis of the cylindrical vessel. Filaments at this helix angle properly balance static circumferential and axial stresses in the vessel. In a closed-end cylindrical pressure vessel, the circumferential stress is twice the axial stress.

For a toroidal pressure vessel, the ratio of the circumferential stresses to the axial stresses at a radius equal to the radius of the path of the center of the generating circle is also 2:1, and the optimum helix angle at that point is 54°45′. At smaller radii, the helix angle increases and at larger radii, decreases. The variation of the optimum helix angle from 54°45′ is relatively small for configurations corresponding to practical elbow shapes. Therefore, an elbow reinforced with all fibers disposed at a helix angle of 54°45′ has near optimum strength.

A method of producing a filament-would elbow with a constant 54°45′ helix angle would be as follows:

Step 1

Rotate the elbow at constant angular velocity about the axis of one of the cylindrical ends.

Step 2

Move the elbow at constant linear velocity parallel to the axis of the cylindrical end, past a filament-delivery point, to wind the filaments at the desired constant helix angle on the cylindrical end.

Step 3

When the helical filament path reaches the juncture of the cylindrical end and toroidal center section of the elbow, cease the linear movement of the elbow and begin to rock the elbow about the axis of the toroidal section while continuing to rotate it about an axis which was originally the axis of the cylindrical end. By varying the angular velocity of rocking while rotating at constant velocity, or by varying the rotating velocity while rocking at constant velocity, or a combination thereof, a constant-angle helix may be wound by the filament on the surface of the torus.

Step 4

When the helical filament path reaches the juncture of the torus and the second cylindrical end, stop the rocking of the elbow about the center of its torus, but continue to rotate the elbow about the horizontal axis which was the axis of the original cylindrical end, and move the elbow at a constant linear velocity (equal to the original linear velocity) parallel to the axis of the second cylindrical end to wind the filament at a constant-angle helix on the second cylindrical end.

The process just described for winding filaments along constant helix angle paths on pipe elbows would require complex mechanical equipment. A simpler device that would require only constant rocking and rotating velocities could be used to wind pipe elbows with filaments which lie along toroidal helices, rather than along constant-angle helices, on the toroidal section. Attempts in the past to achieve such winding with a helix angle near the optimum of 55° have not been successful, because the filaments slipped on the surface of the toroid, causing "roping" or twisting of the band of filaments and inaccurate reinforcement placement. The resulting compromised helical path produced fittings of inadequate strength.

The filaments slipped because, when applied wet on a mandrel, they are quite slippery and, if wound on a non-stable path, will tend to slip to a stable path. Minor deviation from a perfectly stable path (one which requires no friction between filament and mandrel to avoid filament slippage) is possible and is common practice in reversing filament winding direction on a cylindrical pipe mandrel. However, the acceptable limit of deviation from the ideal path is directly related to the available friction. The stable "frictionless" path on any surface is a geodesic because of the inherent alignment of the principal normal to the geodesic and the surface normal.

For nearly circumferential windings, say, a helix angle of 80° to 89°, geodesics and toroidal helices are similar, and because of friction, the toroidal helix is stable. For curves with helix angles averaging 54°45′, geodesics and toroidal helices are quite different, with variations of as much as 30° to 40°. Such differences exceed the limits of friction, and toroidal helices slip to more stable paths which approximate geodesic paths.

As mentioned above, the present invention provides apparatus and method in which the rocking and rotating motions need not have to have a fixed relationship to each other. A variable relationship is provided by the band of filaments sliding back and forth laterally on the curved fingers during the winding operation, which produces an apparent variation during winding, or by using a numerically controlled drive system, which can produce an actual variation, either during winding or from one run to the next. A numerically controlled drive system has the following advantages:

(1) it avoids the necessity of changing hard gears when size changes are made;

(2) it makes possible an easy transition from rocking of the elbow to translation of the delivery point for winding the cylindrical ends; and (3) it makes possible deviations in the paths of the filaments along the toroidal section from pure toroidal helices.

In operating the apparatus of this invention at a constant ratio of rocking and rotating motions, and using the curved finger delivery system, we observed that instead of a toroidal helix path being generated by the band of filaments on the mandrel, a path more nearly the geodesic path was produced. This departure of the path from the toroidal helix resulted from a fairly complex relationship between the rocking and rotating motions of the elbow, the diameter and radius of curvature of the elbow, and the geometry of the curved finger filament delivery system to produce results which are surprising in the following ways:

(1) When toroidal helices with an average helix angle on the order of 55° are attempted with fixed rocking and rotating rates and with the curved finger delivery system, the geometrical relationships produce filament paths which are nearly geodesic, and which should require variable rocking and rotating rates.

(2) Modifications of the geometrical relationships between the delivery system and mandrel and modifications of the rotating/rocking drive relationships can produce, within the limits of friction, filament paths with nearly constant helix angles.

(3) Suitable modifications of the relationships among mandrel geometry, curved finger delivery system geometry, and the relative motions of rocking and rotating of a mandrel and translation of the delivery system can produce whatever path of filaments (within the limits of friction) on the mandrel that may be desired for any stress condition in the finished elbow. For example, the numerically controlled system can be programmed to trace any desired curve on the mandrel. However, the programming necessary to trace either a geodesic or a constant helix path on the mandrel would be relatively complex, particularly because a new program would be required for each path traced from one end of the mandrel to the other, if the starting points of each of the paths were separated angularly from one another at their starting planes at the ends of the mandrel.

(4) While winding with a fixed velocity relationship between the rocking and rotating motions of the mandrel, the curved finger delivery system causes lags, in response to changing helix angle, between the curved fingers and the points of tangency of the band of filaments on the mandrel. This, in effect, varies the rocking velocity of the mandrel. Additionally, the position of the band of filaments on the curved fingers moves laterally back and forth in response to helix angle changes, and effectively varies the rotational rate by varying mandrel orientation to the position of the band of filaments on the fingers. The result is a surprising self-compensating feature that produces a nearly geodesic filament on the mandrel while rocking and rotating relationships are held constant.

(5) The curved finger delivery system also automatically adjusts the filament band width in response to changing helix angles and movement of the band as it alternately wraps around the inner and outer portions of the torus, and thus provides complete coverage of the torus without excessive overlapping, which would be produced by a band that remained constant in width around the full circumference of the torus.

Trial parts made while operating the machine described above with respect to FIGS. 6–16, with a constant ratio of rocking and rotating, showed adequate resistance to circumferential and axial stresses produced by internal pressures, particularly if the rocking and rotating ratio was set to produce nearly a 55° helix angle on the outside radius of the torus where the elbow wall is thinnest. A buildup of material naturally occurs on the inside radius of the torus, and even though the resulting helix angles were not optimum by netting analysis calculations, the strength of the resin matrix, together with the filaments, produced adequate strength. Trial parts made by varying the rocking rate relative to the rotational rate to produce more nearly constant helix angles showed slight improvement, but the improvement was judged not to be worth the extra programming effort.

In summary, the advantages of the present invention lie largely in the fact that the combination of complex relationships among the shape of the mandrel, the geometry of the curved finger delivery system and its relationship to the geometry of the mandrel, and the variable relationships which may be produced between rocking, rotating, and translating motions of the machine by proper programming of the numerically-controlled drive system allow a wide range of filament paths to be generated on the surface of the mandrel with surprising ease. The guide fingers also permit the winding of the mandrel to be quickly reversed in a minimum amount of turnaround time at each of the cylindrical ends because, as the relative movement between the guide fingers and the mandrel decreases, the helix angle becomes 90°, i.e., the band of filaments is perpendicular to the longitudinal axis of rotation of the mandrel. This permits the relative movement of the fingers and mandrel to be reversed quickly and establish the required lag for the desired helix angle in a minimum amount of longitudinal travel. Such action substantially reduces end trim losses, i.e., the amount of material which must be cut from the ends of the fitting or pipe to produce the final product.

We claim:

1. A method for making a pipe fitting having a nonlinear centerline lying in a substantially flat plane by wrapping filaments around a mandrel in the shape of the fitting, the method comprising the steps of:

disposing the mandrel adjacent a winding station;

rotating the mandrel about an axis which is fixed in space and which lies in the plane of the nonlinear centerline;

passing the rotating mandrel through the winding station while maintaining the nonlinear centerline substantially tangent to the axis of rotation at the winding station;

wrapping filaments around the mandrel in a curved path as it moves past the winding station; and applying a curable resin to the filaments.

2. A method according to claim 1 which includes the step of passing the filaments between two longitudinally spaced guide fingers at the winding station, the guide fingers being curved to extend at least part way around the mandrel.

3. A method according to claim 2 in which a central portion of the mandrel is a segment of a toroid, and each end of the mandrel includes straight, cylindrical sections, the method including the steps of oscillating the mandrel through the winding station to pass the toroidal portion of the mandrel through the winding station, stopping the oscillation of the mandrel when a straight, cylindrical section of the mandrel is at the winding station, and moving the guide fingers longitudinally while the oscillation of the mandrel is interrupted to wind filaments around the cylindrical portion of the mandrel at the winding station, and thereafter resuming oscillation of the mandrel.

4. A method according to claim 3 which includes the step of coordinating the oscillation of the mandrel with the movement of the guide fingers so that as the mandrel comes to the end of one oscillation, the guide fingers start to move before the oscillation is completely stopped.

5. A method according to claim 1, 2, 3, or 4 in which the filaments are wound around the mandrel at a helix angle between about 30° and about 70°.

6. A method according to claim 1, 2, 3, or 4 in which the filaments are wound around a toroidal mandrel, and the helix angle of the filaments at the outside radius of the mandrel is about 60°, and the helix angle of the filaments at the inside radius of the mandrel is about 40°.

7. Apparatus for making a nonlinear pipe fitting by winding filaments in continuous curved paths around a mandrel in the shape of the fitting, the mandrel having a longitudinally extending nonlinear centerline, the apparatus comprising:

a spindle having a longitudinal axis;

an outwardly extending bracket secured to the spindle;

means for securing the mandrel to the bracket;

dispensing means for supplying filaments to the mandrel;

means for rotating the spindle about its longitudinal axis, the axis of spindle rotation having a fixed orientation relative to the dispensing means;

means for simultaneously moving the bracket and mandrel laterally and longitudinally relative to the spindle about an axis spaced from and transverse to the spindle axis as the spindle rotates to cause the centerline of the mandrel to move through a point substantially on the longitudinal axis of the spindle and at a substantially fixed distance from the last point of contact between the filaments and the delivery means so the filaments wind around the mandrel in a continuous curved path; and means for applying a curable resin to the filaments.

8. Apparatus according to claim 7 which includes means for securing one end of the mandrel to the bracket, while leaving the other end of the mandrel free.

9. Apparatus according to claim 7 which includes a pair of guide fingers spaced longitudinally along the longitudinal axis of spindle rotation, so the filaments pass between the guide fingers, the guide fingers each being curved to fit around at least a portion of the mandrel.

10. Apparatus according to claim 9 which includes means for moving the guide fingers longitudinally relative to the spindle.

11. Apparatus according to claim 7 which includes means for varying the path along with the bracket and mandrel move laterally and longitudinally.

12. Apparatus for making a nonlinear pipe fitting by winding resin-coated filaments around a mandrel in the shape of the fitting, the apparatus comprising:

a spindle having a longitudinal axis;
means for rotating the spindle about its longitudinal axis;
a first bell crank having two arms joined at an apex;
first pivot means connecting one arm of the first bell crank to the spindle to rotate about an axis transverse to the longitudinal axis of the spindle;
a second bell crank having two arms joined at an apex;
second pivot means connecting the second bell crank at its apex to the apex of the first bell crank to rotate about an axis transverse to the longitudinal axis of the spindle;
a first link;
third pivot means connecting one end of the first link to the other arm of the first bell crank to rotate about an axis transverse to the longitudinal axis of the spindle;
a second link;
fourth pivot means connecting the other end of the first link to one end of the second link to rotate about an axis transverse to the longitudinal axis of the spindle;
fifth pivot means connecting the other end of the second link to one arm of the second bell crank;
means for securing the mandrel to the second link;
a third link;
sixth pivot means connecting one end of the third link to the spindle to rotate about an axis transverse to the longitudinal axis of the spindle;
seventh pivot means connecting the other end of the third link to the other arm of the second bell crank;
means for moving the third link and the first bell crank about the sixth and first pivots, respectively, to cause the mandrel to move laterally and longitudinally with respect to the spindle longitudinal axis as the spindle rotates; and
means for wrapping resin-coated filaments around the mandrel as the spindle rotates.

13. Apparatus according to claim 12 which includes a push lever connected at one end to the one arm of the first bell crank at the first pivot means and means for oscillating the push lever about the first pivot means.

14. Apparatus according to claim 13 which includes a push rod connected at one end to push lever at a point spaced from the first pivot means and means for reciprocating the push rod longitudinally relative to the axis of spindle rotation to oscillate the push lever about the first pivot means.

15. Apparatus according to claim 14 in which the means for connecting the push rod to the push lever includes a first universal joint, and which includes a drive disk mounted to rotate about an axis transverse to the longitudinal axis of the spindle, a second universal joint connecting the drive disk to the push lever, and means for oscillating the drive disk about its axis.

16. Apparatus according to claim 12 which includes a pair of guide fingers longitudinally spaced along the longitudinal axis of the spindle and disposed so the resin-coated filaments pass between them, each guide finger being curved to extend at least partially around the mandrel.

17. Apparatus according to claim 16 which includes means for moving the guide fingers back and forth along the longitudinal axis of the spindle.

18. Apparatus according to claim 12 which includes means for varying the angle between the first and second arms of the first bell crank.

19. Apparatus according to claim 12 which includes means for varying the angle between the first and second arms of the second bell crank.

20. Apparatus according to claim 19 which includes means for varying the angle between the first and second arms of the second bell crank.

21. Apparatus according to claim 12 which includes means for securing one end of the mandrel to the second link, while leaving the other end of the mandrel free.

22. Apparatus according to claim 12 which includes an elongated and outwardly extending stud mounted on the second link and adapted to extend through the mandrel, a cap adapted to fit over the end of the mandrel remote from the support, and means for releasably securing the cap to the stud.

23. Apparatus according to claim 22 which includes means for spring-loading the cap against the mandrel.

24. Apparatus for making a nonlinear pipe fitting by winding filaments in curved paths around a mandrel in the shape of the fitting, the mandrel having a longitudinal axis lying in a substantially flat plane, and the apparatus comprising:

a spindle having a longitudinal axis fixed in space;
an outwardly extending bracket secured to the spindle;
means for securing the mandrel to the bracket;
means for rotating the spindle, bracket, and mandrel about the longitudinal axis of the spindle;
means for moving the rotating bracket and mandrel laterally and longitudinally relative to the spindle axis about a point spaced from the spindle axis and in a plane defined by the spindle and mandrel longitudinal axes as the spindle rotates;
means for winding filaments around the mandrel as the spindle rotates and the bracket moves laterally and longitudinally; and
means for applying a curable resin to the filaments.

* * * * *